US00RE38348E

(19) United States
(12) Reissued Patent
Bloss, Jr. et al.

(10) Patent Number: US RE38,348 E
(45) Date of Reissued Patent: Dec. 16, 2003

(54) BATTERY ASSEMBLY

(75) Inventors: Kenneth R. Bloss, Jr., New Berlin, WI (US); H. Paul Walding, Jr., Slinger, WI (US); Jeffrey L. Sell, Hartland, WI (US)

(73) Assignee: Badger Meter, Inc., Milwaukee, WI (US)

(21) Appl. No.: 09/989,830

(22) Filed: Nov. 20, 2001

Related U.S. Patent Documents

Reissue of:
(64) Patent No.: 6,111,519
Issued: Aug. 29, 2000
Appl. No.: 09/257,679
Filed: Feb. 25, 1999

U.S. Applications:

(62) Division of application No. 08/909,907, filed on Aug. 12, 1997, now Pat. No. 5,877,703.

(51) Int. Cl.[7] ..... G08C 15/06
(52) U.S. Cl. ..... 340/870.02; 324/157; 361/659; 429/100; 73/273

(58) Field of Search ..... 340/870.02; 324/156, 324/157; 361/659

(56) References Cited

U.S. PATENT DOCUMENTS

| | | | | | |
|---|---|---|---|---|---|
| 4,075,561 | A | * | 2/1978 | Stevens | 324/156 |
| 4,297,635 | A | * | 10/1981 | Stevens | 324/156 |
| 4,713,609 | A | * | 12/1987 | Losapio et al. | 324/156 |
| 4,791,362 | A | * | 12/1988 | Philpot | 324/157 |
| 5,049,810 | A | * | 9/1991 | Kirby et al. | 324/156 |

* cited by examiner

*Primary Examiner*—Timothy Edwards
(74) *Attorney, Agent, or Firm*—Quarles & Brady LLP

(57) ABSTRACT

An improved assembly (10) for housing electronics for remote reading to meter reading data in a subsurface enclosure (11) includes a first inner enclosure (40) of metal for housing the receiver/transmitter circuitry (90), a second inner enclosure (69, 86) for housing a battery (65) and an outer enclosure (24) of plastic which encloses both of the inner enclosures.

13 Claims, 2 Drawing Sheets

BATTERY ASSEMBLY

Matter enclosed in heavy brackets [ ] appears in the original patent but forms no part of this reissue specification; matter printed in italics indicates the additions made by reissue.

CROSS-REFERENCE TO RELATED APPLICATIONS

This is a divisional of U.S. application Ser. No. 08/909,907 filed Aug. 12, 1997, and now U.S. Pat. No. 5,877,703 issued Mar. 2, 1999.

TECHNICAL FIELD

The invention relates to electronic instrument enclosures that are located with utility meters outside of a building in underground enclosures.

DESCRIPTION OF THE BACKGROUND ART

In moderate climate zones, utility meters are located in subsurface enclosures in areas near residences or other dwellings. Such enclosures are referred to as "pits." An example of such enclosure is illustrated in Haase et al., U.S. Pat. No. 1,781,280.

In Edwards et al., EPO Publication No. 0 252 184, meter data is transmitted from a utility meter in an underground pit to an in-ground electronic coupling circuit and then to an electronic collection unit carried by a meter reading person. Scuilli, U.S. Pat. No. 4,758,836, shows an electronic metering unit which uses the inductive coupling method of the metering unit of Edwards et al.

Besides inductive coupling system, radio frequency transponder systems have also been known. Examples are illustrated and described in Cerny et al., U.S. Pat. No. 5,298,894, issued Mar. 29, 1994, and assigned to the assignee of the present invention. In these systems, a receiver/transmitter, and an associated antenna are enclosed in one or more sealed enclosures which are located in a larger pit for the water meter. When the transponder is interrogated by a signal, it returns a radio signal to a collection unit, either hand-held or carried by in a vehicle, where the radio signal can then be decoded to extract the meter data.

A primary issue concerning all remote meter systems, whether used in pit installations or elsewhere, is their resistance to weather, and to submersion in the event that the pit fills with water. Therefore, a primary object of the invention is to provide a device that is resistant to environmental conditions in its operating environment.

Typically, the data storage device is powered by one or more batteries, which must also be contained in a sealed enclosure. For an example of a prior battery assembly, please refer to Karsten et al., U.S. Pat. No. 5,476,731, assigned to the assignee of the present invention.

Therefore, another object of the invention is to provide for battery replacement in the field without adversely affecting the environmental protection of the electronics in the assembly.

As with other electronic devices, there is also a desire to make the devices smaller in size, lower in the cost of manufacture, and easier to service in the field.

SUMMARY OF INVENTION

The invention is provided in an improved battery enclosure which can also be enclosed within an outer enclosure but removed, in the event that the battery must be changed, without affecting the environmental protection of the other portions of the assembly.

The invention provides a fully remote meter reading system with weather-resistant features that permit installation of the transponder unit in outdoor underground enclosures.

The invention provides a unit of reduced size and weight, and yet provides the weather resistance and operating features of prior units.

The invention also provides a unit having advantages in its assembly and manufacturing.

Other objects and advantages, besides those discussed above, will be apparent to those of ordinary skill in the art from the description of the preferred embodiment which follows. In the description, reference is made to the accompanying drawings, which form a part hereof, and which illustrate examples of the invention. Such examples, however, are not exhaustive of the various embodiments of the invention, and, therefore, reference is made to the claims which follow the description for determining the scope of the invention.

DETAILED DESCRIPTION OF THE PREFERRED EMBODIMENT

Figure 1:
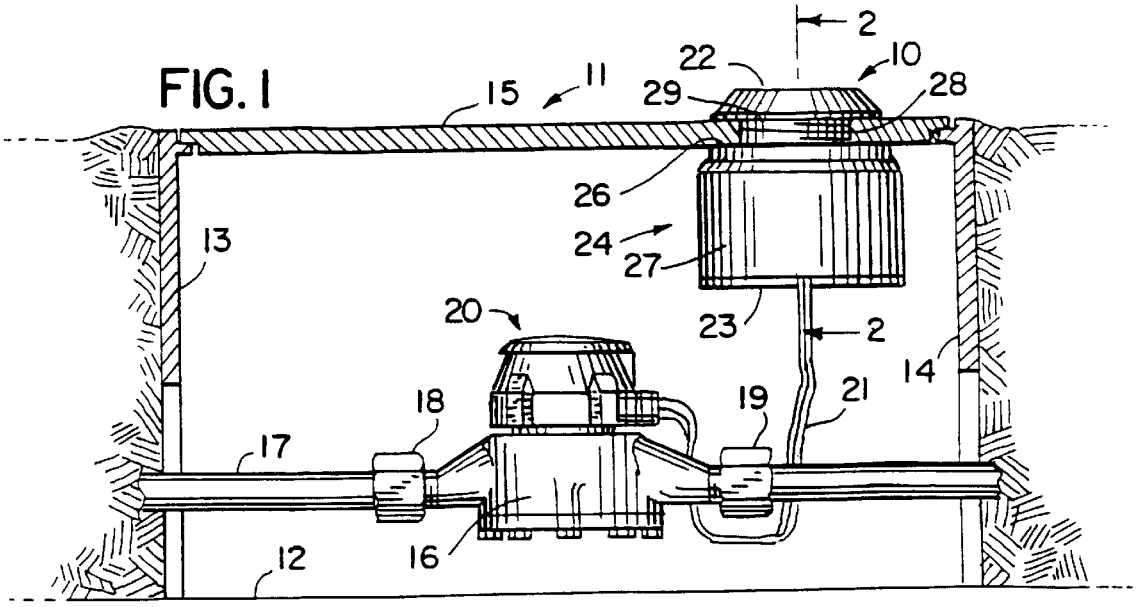
FIG. 1 is a general pictorial illustration showing the present invention in its operating environment.

Referring to FIG. 1, the invention is incorporated in a remote transponder assembly 10 located in a subsurface pit enclosure 11. The term "transponder" shall mean electronic circuitry for receiving an interrogation or "read" signal and electronic circuitry for sending meter data signals. The signals are received and transmitted through an associated antenna. These items will be described in more detail below with respect to the preferred embodiment.

The pit enclosure 11 (FIG. 1) includes side walls 13, 14 and a lid 15 which is removable to open the enclosure for access. A bottom wall 12 is optional. The pit enclosure 11 in this embodiment is made of metal, but in other embodiments could be made of concrete or plastic.

The pit enclosure 11 is located along the route of water supply pipe 17. A water meter housing 16 is connected in the water supply line 17, using hex-head nuts 18, 19 which are sealed in a conventional manner against leaks at the connecting points. A water meter register 20 is mounted on top of the housing 16 and is magnetically coupled to the movements of the nutating disc in the water meter 16.

The meter register 20 (FIG. 1) is preferably the Recordall™ transmitter register offered by Badger Meter, Inc., the assignee of the present invention. This unit includes an electromechanical device for generating pulses representing units of consumption as described in Strobel et al., U.S. Pat. No. 4,868,566, entitled "Flexible Piezoelectric Switch Activated Metering Pulse Generators." The meter register 20 is electrically connected to the pit transponder assembly 10 via a cable 21, which is preferably a "Belden 4541" shielded pair cable with drain wire. Metering pulses are transmitted from the meter register 20 to the pit transponder assembly 10.

As disclosed in U.S. Pat. No. 5,298,894, cited in the Description of the Background Art, a transponder assembly 10 may communicate via electromagnetic, radio frequency waves to a handheld collection unit (not shown herein) carried by a meter reading person or a collection unit carried in a vehicle (not shown herein). The transponder assembly 10 may also be part of a networked system in which one or more transponder assemblies 10 communicate with local receiver stations which further communicates with a central data collection station.

In addition to different types of data collection systems, different types of meter registers can also be used, including the High Resolution Transmitter (HRT) Series, and the LMI Series from the assignee of the present invention, or other meter registers known in the art.

In the embodiment in FIG. 1, the transponder assembly 10 is attached to pit lid 15 through a hole 29 in the pit lid 15. The outer enclosure 24 for the assembly includes a body with a cylindrical wall 27 closed at the bottom by bottom closure 23, and an upper flange portion 26 leading to the threaded stem 28 that extends through the hole 29. A cap 22 is screwed onto the stem 28 to suspend the assembly 10 from the lid 15. The outer enclosure 24 is preferably made of a durable plastic material to insulate the electronics inside and to provide resistance to corrosion and chemical degradation from substances such as salt water, which may be encountered in harsh environments.

Figure 2:
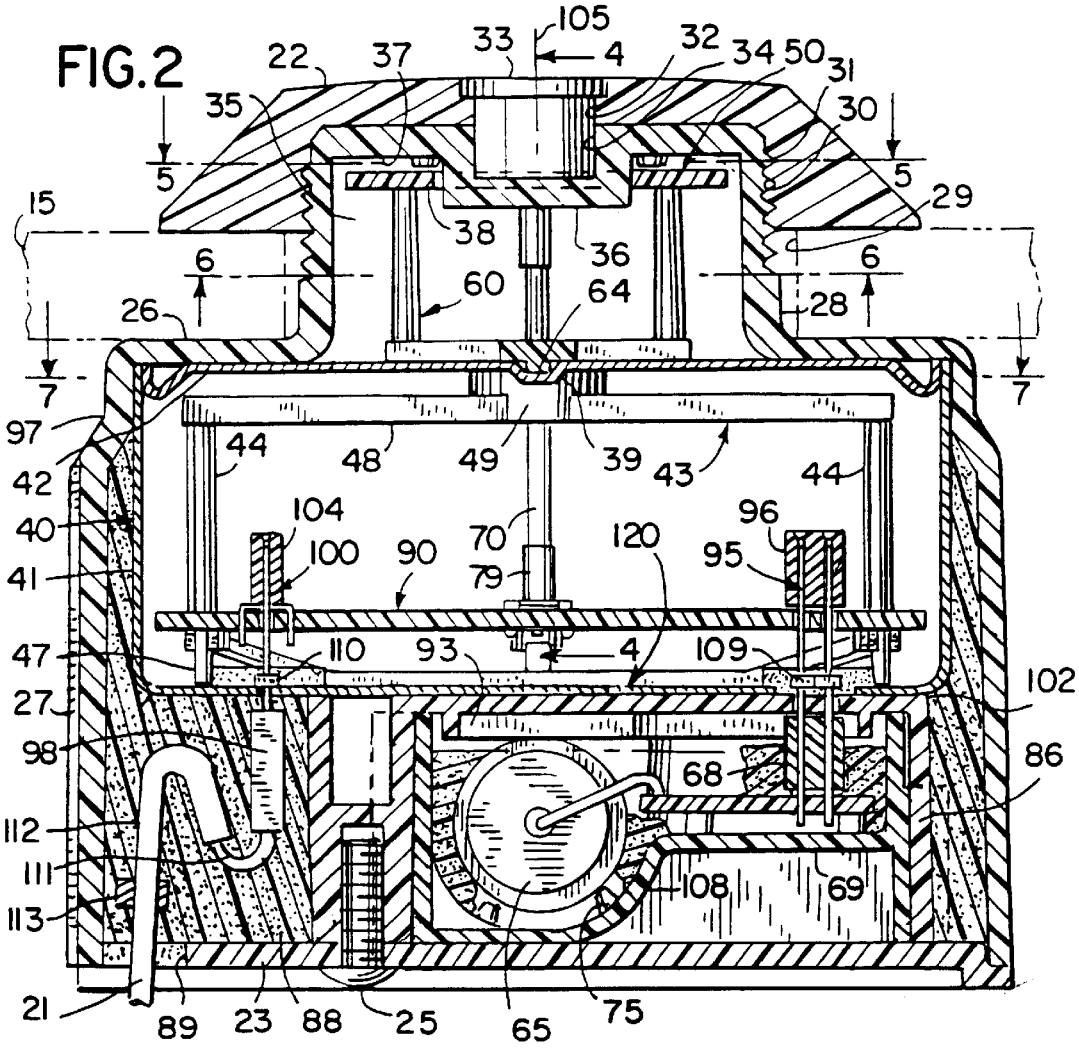
FIG. 2 is a sectional view in elevation taken in the plane indicated by line 2—2 in FIG. 1.

The cap 22, which is also made of plastic, is formed with a recess having inner diameter threads 30 (FIG. 2) for mating connection with outer diameter threads 31 (FIG. 2) on stem 28. The cap 22 also has a flat bottom side which engages a top side of the pit lid 15 and the circular flange portion 26 engages an underside of the pit lid 15 to trap a portion of the pit lid 15 between the flange portion 26 and the underside of the cap 22. The cap 22 also has a hexagonal opening 32 through the center to receive a hex-sided anti-tamper plug 33 (FIG. 2). Stem 28 includes hex socket 34 to receive plug 33.

Referring to FIGS. 1 and 2, the assembly 10 has three main compartments or sections inside the outer enclosure 24. A middle compartment is formed by an inner enclosure 40, which is typically made in two pieces, a seamless cylindrical body 41 and a disc-shaped lid 42. The lid 42 (FIG. 3) is inserted in the open end of the body 41 and welded around an upper rim of the body 41 to seal the inner enclosure 40. The inner enclosure 40 is preferably made of a metal such as copper, tin, or an alloy of either of these materials. The material is preferably one which is easy to form in a thin-walled enclosure, which is easy to weld and which provides a final barrier against moisture penetration, while also providing some measure of corrosion resistance.

Inside the inner enclosure 40 in FIG. 2 is a transponder printed circuit board (PCB) 90 in which receiving and transmitting circuitry and any necessary data storage circuits are mounted on a circuit board substrate. If the system is of the remote, mobile data collector type, the PCB 90 can be purchased from American Meter Company. If the system is of the network type, the PCB 90 can be purchased from CellNet Data Systems of San Carlos, Calif., USA. In alternative embodiments contemplated by the invention, a timed or periodic call-in period could be used such that receiver circuitry would not be necessary and only transmitter circuitry would be included on PCB 90.

This PCB 90 (FIG. 2) is held down against upward movement by a support 43 having three upstanding legs 44. The legs 44 have feet 47 tapering from wider at the top to narrower at the bottom which extend through the substrate of PCB 90. In addition, the legs 44 extend upward to a Y-shaped horizontal member 48 with three angularly spaced parts. Two of the branches of the Y-shaped member are longer than the third branch, so that an annular flange 49 at an intersection of the three parts is eccentrically located with respect the central longitudinal axis 105 of enclosure 24. Annular flange 49 (FIG. 2) projects upward and bears against the ceiling of enclosure 40 to space the horizontal member 48 a distance of such ceiling. The depression 39 in the lid 42 of the inner enclosure 40 is positioned in front of the annular flange 49 as seen in FIG. 2.

PCB 90 is supported from below by a Y-shaped support 120 (FIG. 2) having a Y-shaped base, three extensions angling upward from the base 121 to the underside of the PCB 90, and three arcuate collar parts for fitting around the feet 47 of the upper Y-shaped support member 43.

The outer enclosure 14, which is preferably made of plastic, to resist chemical attack, completely surrounds and encloses the metal inner enclosure 40. The plastic is typically a modified polyphenylene oxide (PPO) material which is resilient to provide protection against unintentional impacts. The outer enclosure provides additional space 35 (FIG. 2) in the hollow stem 28 to form an upper compartment for housing an antenna 50 and an antenna support 60. This hollow portion 35 includes a boss 36 resulting from formation of a socket 34 for receiving the anti-tamper plug 33. Race 37 is formed between the boss 36 and the side wall of stem 28, and this race 37 receives the antenna 50, which is provided as a printed circuit board (PCB). Within the race 37, stand-offs 38 project down from the ceiling to provide spacing of the printed circuit board 50 from the inside surface of the stem 28.

The antenna PCB 50 is supported by a support frame 60, having a Y-shaped base, three legs rising from the ends of base, and pins on the ends of the legs which are received in holes on the PCB 50. The antenna support 60 also has a projection 64 (FIG. 2) extending downward from its center portion to locate the support frame 60 in a depression 39 (FIG. 2) in the lid 42 of the inner metal enclosure 40.

In the present embodiment, the antenna PCB 50 is positioned slightly above the metal pit lid 15 when the transponder assembly 10 is attached to the pit lid 15. However, in embodiments for use in pit enclosures of concrete or plastic, the transponder assembly 10 can be mounted by a mounting flange having a threaded opening similar to cap 22, but fastened with screws underneath the pit lid 15. In these alternative embodiments, the antenna can be positioned underneath the pit lid. The present invention could also be used in other remote transmitter and transponder assemblies, provided that power requirements for the transponder are reduced in accordance with FCC regulations.

Figure 3:
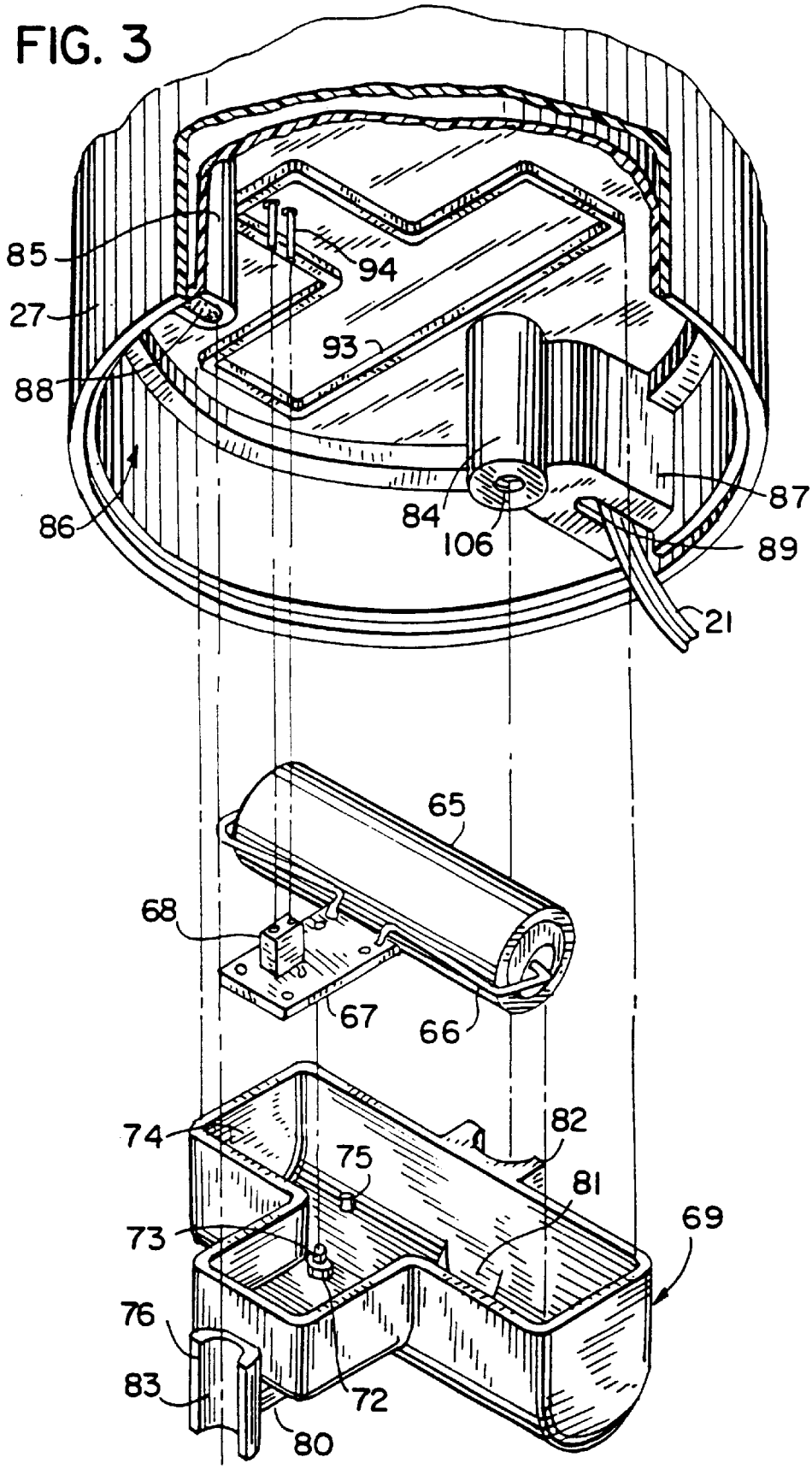
FIG. 3 is a bottom perspective view of the outer enclosure seen in FIG. 2.

Referring again to FIGS. 2 and 3, a lower compartment in the assembly houses a battery 65. The lower compartment is formed by a base member 86 (FIG. 3) and a battery casing member 69 (FIG. 3). The base member 86 supports the inner enclosure 40. Referring to FIG. 3, the base member 86 is cylindrical in shape with a closed top end and an open bottom end. The base member 86 forms a potting well 87 and wire entry port 89 where the cable 21 enters the assembly, is connected to the transponder PCB 90, and where the connection is sealed with potting material 88 seen in FIG. 2. As further seen in FIG. 3, a first cylindrical post 84 having a threaded hole 106 for receiving a fastener is integrally formed with the potting well 87. Opposite the first post 84 is a second, hollow, semi-cylindrical post 85, which forms a second injection port for potting material 88. The two spaced apart posts 84, 85 are also utilized to locate the battery casing 69 when it is assembled to the base member 86.

The battery casing 69 is formed to hold a single battery 65 in this embodiment. The battery 65 is connected by leads 66 to connector 68 via a battery circuit board 67. This assembly of parts 65–68 is positioned in battery casing 69, with the circuit board supported by posts 72 having pins 73 to retain and locate the circuit board 67. The battery 65 is received in semi-cylindrical battery trough 74 in which stand-offs 75 are formed to support the battery 65 above the casing wall. A first guide channel member 76 is formed on a wall of the battery casing which extends around the circuit board 67. A web 80, partially visible in FIG. 3, runs perpendicular to the trough 74 along the bottom of the casing to a well 81. The web 80 provides a place to grip the battery casing 69 with a thumb and forefinger when installing or removing the battery assembly 65–69 in the larger assembly 10. The well 81 is necessary for forming another guide channel member 82. The members 76, 82, provide semi-circular channels 83 for sliding onto the posts 84, 85 formed in the base member 86 to thereby locate the battery casing 69. A grease is applied to the socket 68 to prevent potting material 108 from flowing into the openings for receiving the pins 94.

When assembling the battery subassembly, the battery 65 is placed in casing 69 and a sealing material 108 is filled in, around and over the battery 65 as seen in FIG. 2. This seating material 108 is softer, more ductile and has a longer cure time than sealing material 88. The base member 86 has a gasket 93 formed by a guard rail that traces an outline of the open side of the battery casing 69, but is sized to fit inside the outside walls of the battery casing 69, when it is pressed against the base member 86. The gasket 93 is then spaced a short distance inside the walls of casing 69. The sealing material 108 is filled in, around and over the battery 65 in the subassembly of components 69, 86 and is allowed to cure and solidify. It remains, however, deformable, and when the battery casing 69 and battery are installed over guard rail 93, the guard rail 93 is pressed into the soft body of sealing material 108 and becomes embedded there.

As seen in FIG. 3, the gasket 93 also orients the battery casing 63 so that the 2-pin socket 68 on the battery circuit board 67 will be aligned with two pins 94 on an electrical connector 95 for making connection with the transponder PCB 90. The pins 94 on the electrical connector 95 extend through a plastic body 109 for supporting and mounting the connector 95. The pins 94 are received in a socket 96 mounted on PCB 90.

The cable 21 with plug socket 98 is inserted and connected as shown in FIG. 2. The cable 21 has three insulated wires 111, one of which is shown in FIG. 2. The three insulated wires are sheathed in a cable insulation jacket 112. A strain relief collar 113 of metal is crimped on a cable insulation jacket 112, and prevents a length of cable 21 from being pulled through wire entry port 89.

A room temperature vulcanizing adhesive/sealant 88 is admitted through the port 85 until it fills the annular space (FIG. 2) between side wall 27 of enclosure 24 and the side wall of inner enclosure 40. The outer enclosure 24 has an inwardly tapering shoulder 97 at the upper end of side wall 27 to block sealant from entering antenna chamber 35.

Cable socket 98 is plugged into pins of connector 100 (FIG. 2) to electrically connect the cable 21 to connector 100. Electrical connectors 95, 100 are preassembled with inner enclosure 40 using molded disks of epoxy adhesive. The epoxy is used to cover slots 102 in the metal enclosure body 41 to secure the plastic bodies 109, 110 of connectors 95, 100 in place and to insulate the pins from the metal enclosure body 41. The three pins of connector 100 are aligned along an axis that is rotated 90° from an axis of alignment for the two pins of connector 95. Similarly, socket 96 on PCB 90 is rotated 90° from an axis of alignment for socket 104 on PCB 90.

This asymmetrical arrangement of the pins assures proper orientation and electrical connection of the battery casing assembly to the PCB 90 in inner enclosure 40. In lieu of using sockets 96. 104, the pins could also be directly soldered to the PCB 90.

After the battery casing 69 with battery 65 is assembled within casing 86, cable 21 has been connected, and sealing operations have been completed, the bottom cover 23 (FIG. 2) is attached and fastened with a screw 25 (FIG. 2) which is received in a threaded hole 106 in post 84 (FIG. 3). The screw 25 has a head requiring a specific driver for inserting and removing the screw 25, which provides tamper resistance.

Although the preferred embodiment utilizes a battery casing with one battery, a battery casing for two batteries and for a larger single batteries is also contemplated as being within the scope of the invention. In such an assembly, the casing may be oriented perpendicular to the position of battery 65 with respect to posts 84, 85, and the battery casing may more completely fill the cavity in base member 86.

This has been a description of examples of how the invention can be carried out. Those of ordinary skill in the art will recognize that various details may be modified in arriving at other detailed embodiments, and these embodiments will come within the scope of the invention.

Therefore, to apprise the public of the scope of the invention and the embodiments covered by the invention, the following claims are made.

We claim:

1. A battery assembly for use in a utility meter data collection unit, the battery assembly comprising:

a casing for receiving a battery and sealing material to be disposed in the casing and around at least a portion of the battery;

an electrical socket which is electrically connectable to said battery and which is connectable to supply battery power to the utility meter data collection unit;

means formed on said casing for locating said casing in position within said utility meter data collection unit; and said casing being insertable and removable from a position in which said socket can be connected to supply battery power to the utility meter data collection unit.

2. The battery assembly of claim 1 in which said casing is T-shaped with a stem portion and a cross bar portion, and wherein said socket is disposed in said stem portion and said battery is disposed in said cross bar portion, and said means for locating is formed along an axis perpendicular to said cross bar portion and to a longitudinal axis of said battery.

3. The battery assembly of claim 1, further comprising sealing material disposed in the casing to cover the battery.

4. The assembly of claim 3, in which the assembly includes a base member, wherein the sealing material is deformable and wherein a gasket is formed on a bottom interior surface of the base member, said gasket being received in the seating material when the battery casing is assembled to the base member to provide a sealed bottom enclosure for the battery.

*5. A battery assembly for use in a utility meter data collection unit, the battery assembly comprising:*

*a casing for receiving a battery and sealing material to be disposed in the casing and around at least a portion of the battery;*

*at least two electrical leads which are electrically connectable to said battery and which are connectable to supply battery power to the utility meter data collection unit;*

*a pair of oppositely disposed projections formed on said casing for locating said casing in a position within said utility meter data collection unit which is defined by a pair of oppositely disposed members, wherein each of said members cooperates with a respective one of said projections; and*

*said casing being insertable and removable from the position within said utility meter data collection unit in which said leads can be connected to supply battery power to the utility meter data collection unit.*

*6. The battery assembly of claim 5, wherein the sealing material is disposed in the casing to fully cover all portions of the battery that would otherwise be exposed.*

*7. The battery assembly of claim 5, wherein said projections for orienting and holding said battery casing are formed along an axis perpendicular to a longitudinal axis of said battery.*

*8. The battery assembly of claim 5, wherein said projections on said battery casing include channels and wherein said members are in the form of posts which are received in said channels when said battery casing is inserted into said utility meter data collection unit.*

*9. A battery assembly for use in a utility meter data collection unit, the battery assembly comprising:*

*a casing for receiving a battery and sealing material to be disposed in the casing and around at least a portion of the battery;*

*at least two electrical leads which are electrically connectable to said battery and which are connectable to supply battery power to the utility meter data collection unit;*

*a pair of oppositely disposed guides for orienting and holding said casing in position within said utility meter data collection unit; and*

*said casing being insertable and removable from a position between said guides in which said leads can be connected to supply battery power to the utility meter data collection unit.*

*10. The battery assembly of claim 9, wherein the sealing material is disposed in the casing to fully cover all portions of the battery that would otherwise be exposed.*

*11. The battery assembly of claim 9, wherein said guides for orienting and holding said battery casing are formed along an axis perpendicular to a longitudinal axis of said battery.*

*12. The battery assembly of claim 9, wherein said guides are formed as oppositely disposed members on said utility meter data collection unit and wherein said battery casing is inserted into position between said oppositely disposed members to locate said battery casing in said utility meter data collection unit.*

*13. The battery assembly of claim 12, wherein said battery casing forms at least a pair of projections which cooperate with said members to locate said battery casing when said battery casing is inserted into said utility meter data collection unit.*

* * * * *